（12）United States Patent
Hwang et al.

(10) Patent No.: US 10,893,537 B2
(45) Date of Patent: Jan. 12, 2021

(54) METHOD FOR DETECTING DOWNLINK CONTROL INFORMATION AND APPARATUS THEREFOR

(71) Applicant: LG ELECTRONICS INC., Seoul (KR)

(72) Inventors: Daesung Hwang, Seoul (KR); Hanjun Park, Seoul (KR); Yunjung Yi, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 16/337,898

(22) PCT Filed: Sep. 22, 2017

(86) PCT No.: PCT/KR2017/010485
§ 371 (c)(1),
(2) Date: Mar. 28, 2019

(87) PCT Pub. No.: WO2018/062780
PCT Pub. Date: Apr. 5, 2018

(65) Prior Publication Data
US 2020/0029354 A1 Jan. 23, 2020

Related U.S. Application Data

(60) Provisional application No. 62/401,235, filed on Sep. 29, 2016, provisional application No. 62/417,260, (Continued)

(51) Int. Cl.
*H04W 72/12* (2009.01)
*H04W 72/04* (2009.01)

(52) U.S. Cl.
CPC ..... *H04W 72/1289* (2013.01); *H04W 72/044* (2013.01); *H04W 72/1273* (2013.01)

(58) Field of Classification Search
None
See application file for complete search history.

(56) References Cited

U.S. PATENT DOCUMENTS

2016/0128028 A1\* 5/2016 Mallik ................. H04L 1/1861
370/336
2017/0251466 A1\* 8/2017 Astely ................. H04L 5/0055
(Continued)

FOREIGN PATENT DOCUMENTS

WO 2016142136 9/2016

OTHER PUBLICATIONS

PCT International Application No. PCT/KR2017/010485, Written Opinion of the International Searching Authority dated Jan. 5, 2018, 19 pages.
(Continued)

*Primary Examiner* — Saba Tsegaye
(74) *Attorney, Agent, or Firm* — Lee Hong Degerman Kang Waimey

(57) ABSTRACT

A method is disclosed for detecting downlink control information. In particular, the method comprises: a step of detecting first downlink control information transmitted from a specific cell; a step of detecting second downlink control information included in a shortened downlink control channel, based on resource information about the shortened downlink control channel included in the first downlink control information, if the first downlink control information is detected; and a step of changing any one of a shortened downlink data channel, a shortened uplink data channel, and transmission/reception timings of ACK/NACK signals, which are set in advance based on the performance of the terminal, if the first downlink control information is not detected.

10 Claims, 9 Drawing Sheets

Related U.S. Application Data filed on Nov. 3, 2016, provisional application No. 62/421,181, filed on Nov. 11, 2016, provisional application No. 62/423,151, filed on Nov. 16, 2016, provisional application No. 62/442,989, filed on Jan. 6, 2017.

(56) References Cited

U.S. PATENT DOCUMENTS

| | | | |
|---|---|---|---|
| 2018/0049272 A1* | 2/2018 | Bagheri | H04W 72/042 |
| 2019/0141681 A1* | 5/2019 | Wang | H04L 5/1469 |
| 2019/0181991 A1* | 6/2019 | Andgart | H04W 72/0446 |
| 2019/0229878 A1* | 7/2019 | Takeda | H04W 72/02 |

OTHER PUBLICATIONS

Huawei, et al., "Details of two-level DCI schemes for short TTI", 3GPP TSG RAN WG1 Meeting #86, R1-166149, Aug. 2016, 6 pages.

LG Electronics, "Discussions on DCI and sPDCCH for latency reduction", 3GPP TSG RAN WG1 Meeting #85, R1-164542, May 2016, 6 pages.

Panasonic, "Discussion on Single level DCI and two-level DCI", 3GPP TSG RAN WG1 Meeting #86, R1-166966, Aug. 2016, 4 pages.

Samsung, "sPDCCH and sDCI design", 3GPP TSG RAN WG1 Meeting #85, R1-164793, May 2016, 6 pages.

* cited by examiner (A) CONTROL-PLANE PROTOCOL STACK (B) USER-PLANE PROTOCOL STACK

METHOD FOR DETECTING DOWNLINK CONTROL INFORMATION AND APPARATUS THEREFOR

CROSS-REFERENCE TO RELATED APPLICATIONS

This application is the National Stage filing under 35 U.S.C. 371 of International Application No. PCT/KR2017/010485, filed on Sep. 22, 2017, which claims the benefit of U.S. Provisional Application No. 62/401,235, filed on Sep. 29, 2016, 62/417,260, filed on Nov. 3, 2016, 62/421,181, filed on Nov. 11, 2016, 62/423,151, filed on Nov. 16, 2016, and 62/442,989, filed on Jan. 6, 2017, the contents of which are all hereby incorporated by reference herein in their entirety.

TECHNICAL FIELD

The present invention relates to a method for detecting downlink control information in a wireless communication system and an apparatus therefor, and more particularly, to a method for detecting a plurality of kinds of downlink control information for scheduling a downlink channel at a shortened Transmission Time Interval (TTI) and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention is to provide a method for detecting downlink control information in a wireless communication system and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

A method for detecting downlink control information by a UE in a wireless communication system according to the embodiment of the present invention comprises the steps of: detecting first downlink control information transmitted from a specific cell; detecting second downlink control information included in a shortened downlink control channel, based on resource information on the shortened downlink control channel included in the first downlink control information, if the first downlink control information is detected; and changing at least one of a shortened downlink data channel, a shortened uplink data channel, and a transmission and reception timing of ACK/NACK signals, which are previously configured based on capability of the UE, if the first downlink control information is not detected.

At this time, the second downlink control information may include information on at least one of the shortened downlink data channel, the shortened uplink data channel and the transmission and reception timing of the ACK/NACK signals for a specific period.

Also, the step of changing the transmission and reception timing may include measuring capability of the UE and reporting the measured capability to the specific cell; receiving information on at least one of the shortened downlink data channel, the shortened uplink data channel, and the transmission and reception timing of the ACK/NACK signals, which are determined by the specific cell, based on the reported capability of the UE; and changing at least one of the shortened downlink data channel, the shortened uplink data channel, and the transmission and reception timing of the ACK/NACK signals, based on the received information.

Also, the first downlink control information may repeatedly be transmitted by including the same information within a specific period.

Also, at least one transmission and reception timing may be changed further considering a size of a transmission block.

Also, the resource information on the shortened downlink control channel included in the first downlink control information may equally be applied to one or more cells which belong to the same group as that of the specific cell, if the first downlink control information is detected.

A UE for detecting downlink control information in a wireless communication system according to the present invention comprises a radio frequency (RF) unit for transmitting or receiving a radio signal to or from a specific cell; and a processor connected to the RF unit, detecting first downlink control information transmitted from the specific cell, detecting second downlink control information included in a shortened downlink control channel, based on resource information on the shortened downlink control channel included in the first downlink control information, if the first downlink control information is detected, and changing at least one of a shortened downlink data channel, a shortened uplink data channel, and a transmission and reception timing of ACK/NACK signals, which are previously configured based on capability of the UE, if the first downlink control information is not detected.

At this time, the second downlink control information may include information on at least one of the shortened downlink data channel, the shortened uplink data channel and the transmission and reception timing of the ACK/NACK signals for a specific period.

Also, the processor may measure capability of the UE and report the measured capability to the specific cell, receive information on at least one of the shortened downlink data channel, the shortened uplink data channel, and the transmission and reception timing of the ACK/NACK signals, which are determined by the specific cell, based on the reported capability of the UE, and change at least one of the shortened downlink data channel, the shortened uplink data channel, and the transmission and reception timing of the ACK/NACK signals, based on the received information.

Also, the first downlink control information may repeatedly be transmitted by including the same information within a specific period.

Also, at least one transmission and reception timing may be changed further considering a size of a transmission block.

Also, the resource information on the shortened downlink control channel included in the first downlink control information may equally be applied to one or more cells which belong to the same group as that of the specific cell, if the first downlink control information is detected.

Advantageous Effects

According to the present invention, processing time can be managed/used efficiently in managing time-frequency domain resources allocated to downlink control information for scheduling of data or control information at a shortened TTI.

It will be appreciated by persons skilled in the art that that the effects that can be achieved through the present invention are not limited to what has been particularly described hereinabove and other advantages of the present invention will be more clearly understood from the following detailed description.

BEST MODE FOR CARRYING OUT THE INVENTION

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system. In addition, while the embodiments of the present disclosure are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
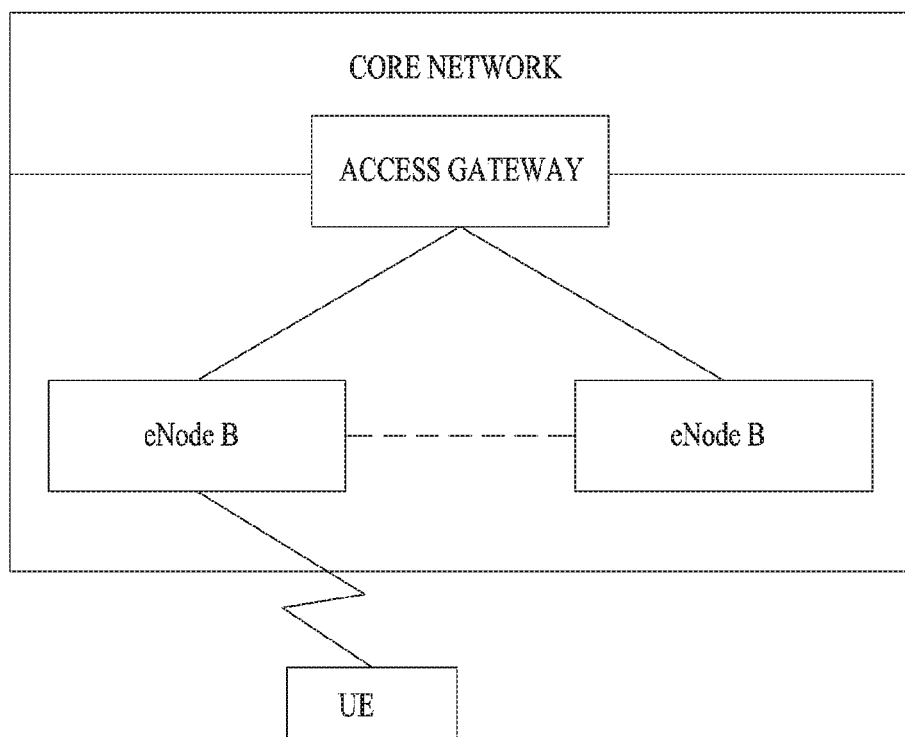
FIG. 1 illustrates a configuration of an Evolved Universal Mobile Telecommunications System (E-UMTS) network as an example of a wireless communication system.
Figure 2:
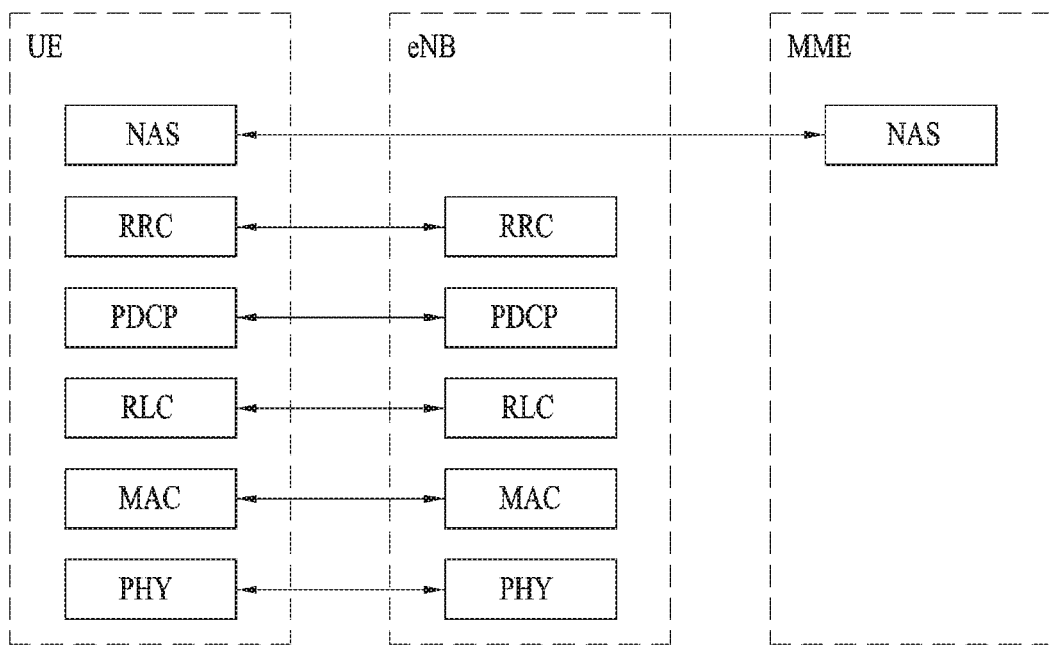
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).
Figure 2:
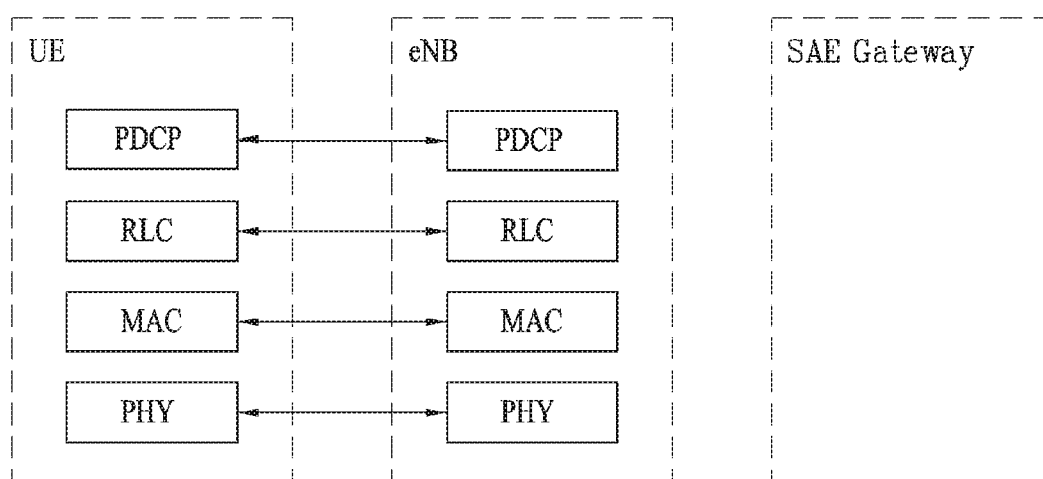

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
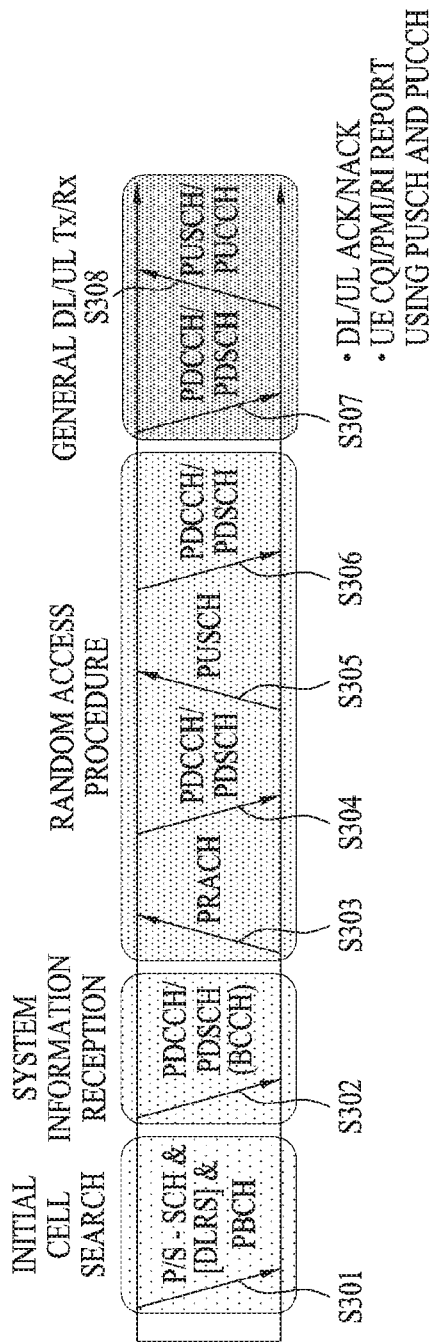
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
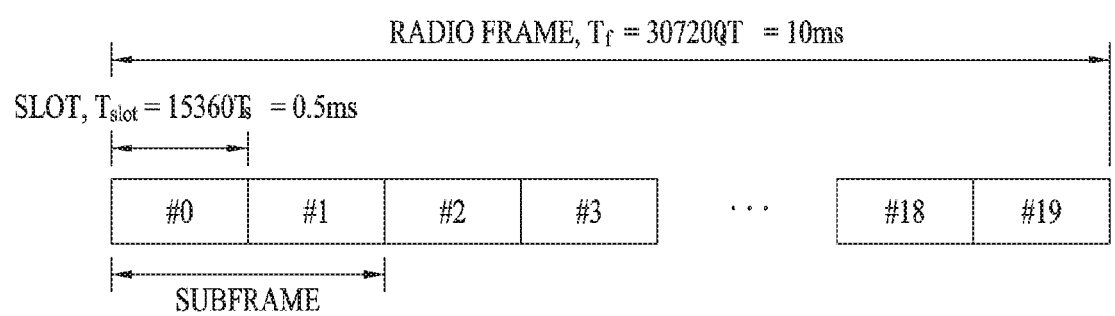
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s$=1/(15 kHz×2048)=3.2552×10$^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
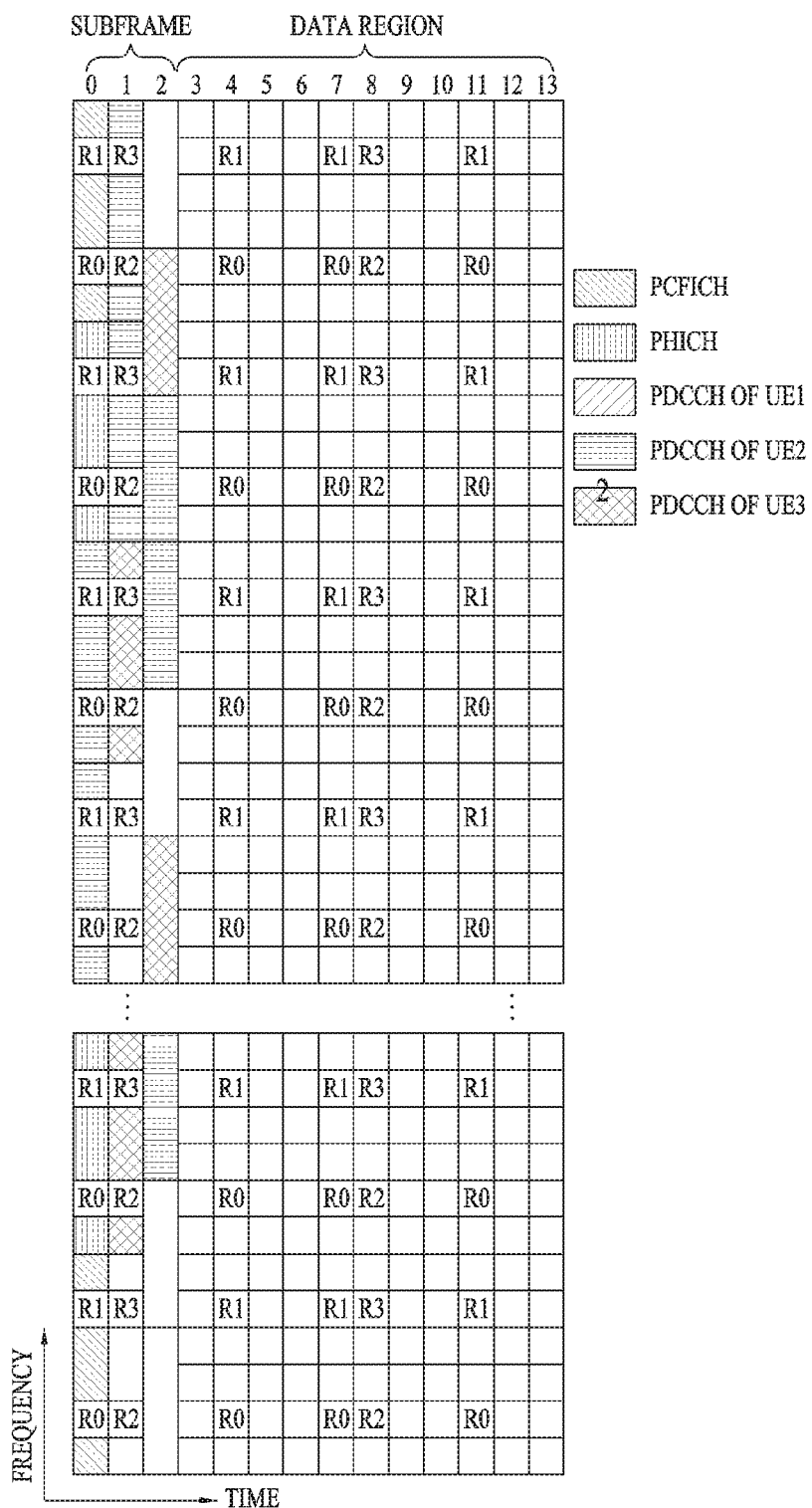
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
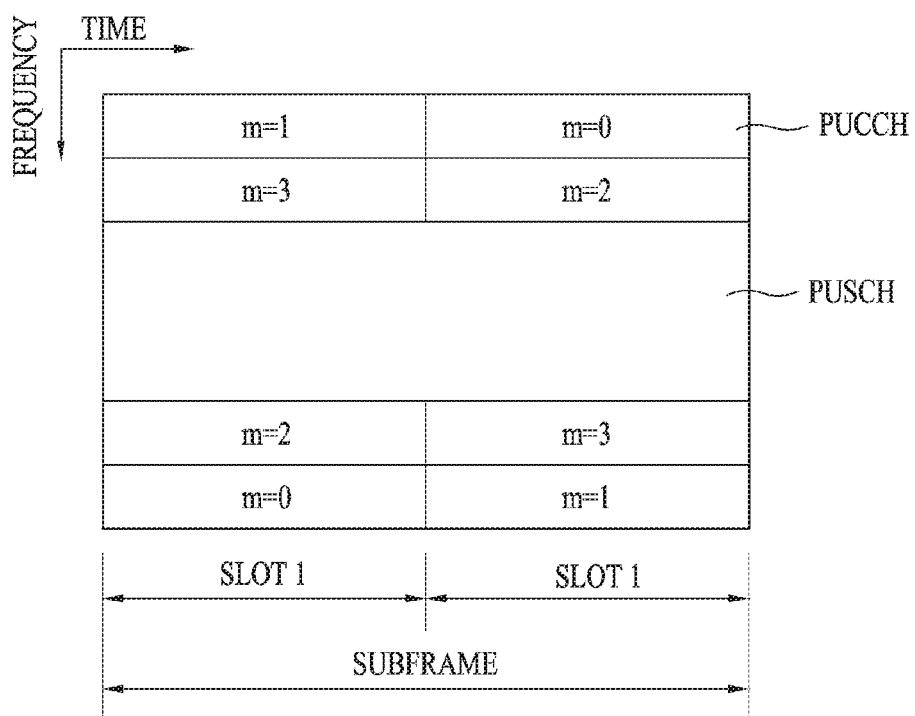
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
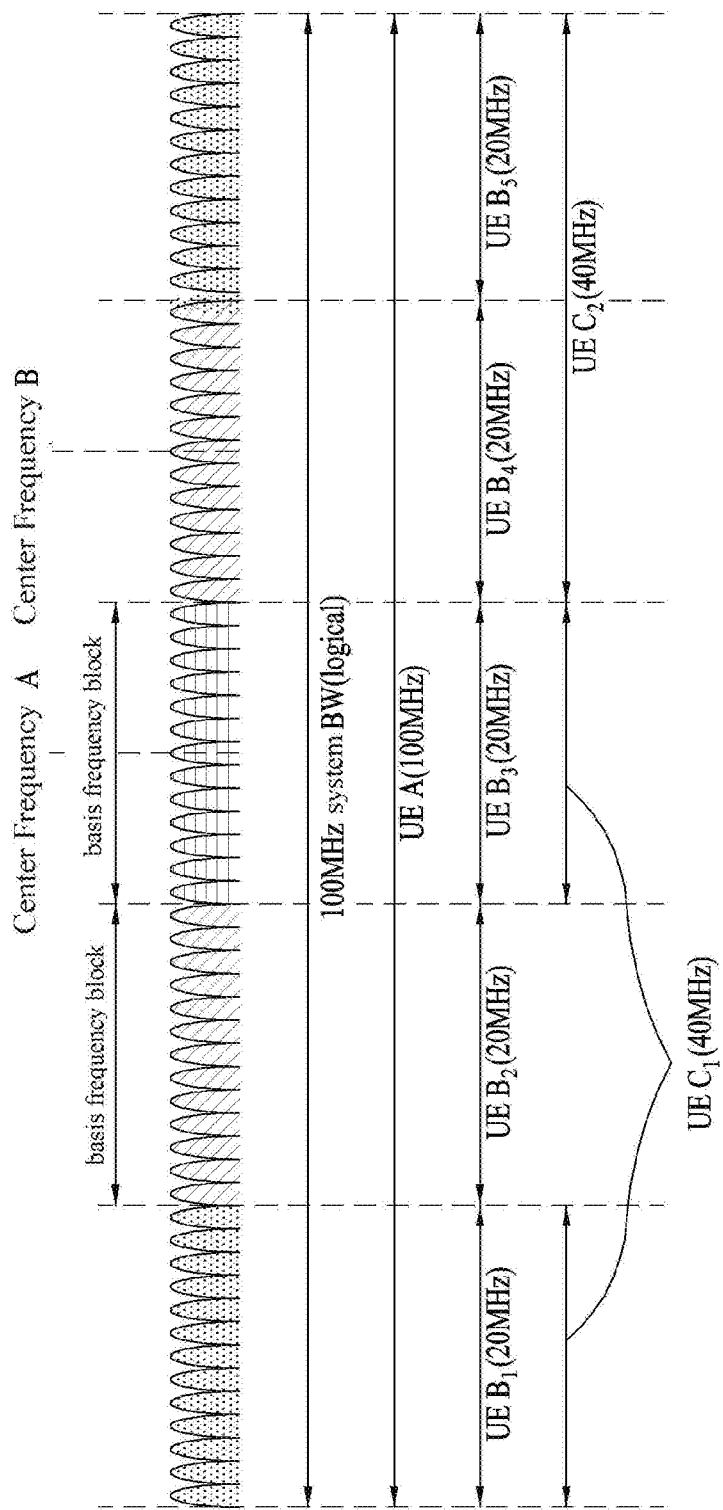
FIG. 7 conceptually illustrates a carrier aggregation scheme.

FIG. 7 conceptually illustrates a carrier aggregation scheme. The carrier aggregation refers to a method of using a plurality of frequency blocks or (logical) cells including uplink resources (or component carriers) and/or downlink resources (or component carriers) by a UE as one large logical frequency bandwidth in order to use a wider frequency band in a wireless communication system. Hereinafter, for convenience of description, the term 'component carrier' will consistently be used.

Referring to FIG. 7, a full system bandwidth (system BW) has a maximum of 100 MHz as a logical bandwidth. The system BW includes five component carriers, each of which has a maximum of 20 MHz of bandwidth. A component carrier includes one or more physically consecutive subcarriers. Although FIG. 7 illustrates the case that component carriers have the same bandwidth, this is only exemplary, and thus the component carriers may have different bandwidths. In addition, although FIG. 7 illustrates the case that the component carriers are adjacent to each other in the frequency domain, FIG. 7 is logically illustrated, and the respective component carriers may be physically adjacent to each other or may be spaced apart from each other.

Different center frequencies may be used for the respective component carriers, or one center frequency common for physically adjacent component carriers may be used. For example, assuming that all component carriers are physically adjacent to each other in FIG. 7, center frequency A may be used. In addition, assuming that component carriers are not physically adjacent to each other, center frequency A, center frequency B, etc. may separately be used with respect to the respective component carriers.

Throughout this specification, a component carrier may correspond to a system band of a legacy system. The component carrier is defined based on the legacy system, whereby it can be easy to provide backward compatibility and to design the system in a wireless communication environment where an evolved UE and a legacy UE coexist. For example, when an LTE-A system supports carrier aggregation, each component carrier may corresponds to a system bandwidth of an LTE system. In this case, the component carrier may have any one of bandwidths of 1.25 MHz, 2.5 MHz, 5 MHz, 10 MHz, and 20 MHz.

When a system bandwidth is extended via carrier aggregation, a frequency bandwidth used for communication with each UE is defined in a component carrier unit. UE A may use 100 MHz as a system bandwidth and perform communication using all five component carriers. UEs $B_1$ to $B_5$ may use only a bandwidth of 20 MHz and perform communication using one component carrier. UEs $C_1$ and $C_2$ may use a bandwidth of 40 MHz and perform communication using two component carries. The two component carriers may or may not be logically/physically adjacent to each other. UE $C_1$ refers to the case that two component carriers that are not adjacent to each other are used and UE $C_2$ refers to the case that two adjacent component carriers are used.

In this case, a method for scheduling a data channel by a control channel may be categorized into a linked carrier scheduling method and a cross carrier scheduling method. In more detail, in the linked carrier scheduling method, a control channel transmitted through a specific component carrier schedules only a data channel through the specific component carrier like in a legacy LTE system which uses a single component carrier. Meanwhile, in the cross carrier scheduling method, a control channel transmitted through a primary component carrier (primary CC) using a carrier indicator field (CIF) schedules a data channel transmitted through the primary CC or another component carrier.

Prior to description of the embodiment according to the present invention, downlink control intended for an operation based on 1 ms TTI including PDSCH/PUSCH will be referred to as DCI, and downlink control intended for an operation of slow DCI and sPDCCH/sPUSCH scheduling will be referred to as sDCI.

Also, (s)DCI which includes resource information on sPDCCH and/or sPDSCH may be referred to as slow DCI. At this time, slow DCI may be transmitted through PDCCH or EPDCCH. Also, sDCI which schedules sPDSCH/sPUSCH will be referred to as fast DCI. This fast DCI may be transmitted through sPDCCH.

Now, a method for detecting a downlink control channel according to the embodiment of the present invention will be described in detail.

In a next generation wireless communication system, it may consider a situation that a TTI (transmission time interval) is variously configured for all physical channels or a specific physical channel to satisfy requirements in various application fields. Particularly, it may consider a case that TTI for physical channels such as PDCCH/PDSCH/PUSCH/PUCCH is configured to be shorter than 1 msec to reduce latency during communication between eNB and UE. Hereinafter, a channel operating at TTI shorter than 1 msec will be referred to as sPDCCH/sPDSCH/sPUSCH/sPUCCH.

In other words, one or more TTIs having different sizes may be configured for one UE. At this time, in a set of TTIs having different sizes, each TTI size may be configured per UE, cell, UE group, or cell group. However, the embodiment according to the present invention is applicable to even the state that one TTI size exists.

Also, a plurality of physical channels may exist in a single subframe (e.g., 1 msec) for a single UE or a plurality of UEs, and the TTI for each physical channel may be configured independently.

Hereinafter, for convenience, a description will be given based on the LTE-(A) system. In the present invention, the TTI includes a normal TTI which is a general subframe size and a shortened TTI (hereinafter, referred to as S-TTI) shorter than the normal TTI. Each of the TTIs may correspond to a unit of a single OFDM symbol, a unit of a plurality of OFDM symbols, or a unit of an SC-FDMA symbol. For convenience of description, although a shortened TTI is assumed, the present invention is extensively applicable to a case that a TTI becomes longer than a subframe or a length of a TTI is longer than 1 ms. Also, it is apparent that the spirits of the present invention are applicable to another system (e.g., New RAT) other than the LTE. Specifically, a shortened TTI may be introduced in the next generation wireless communication system in the form of increasing a subcarrier spacing. In the present invention, it is assumed that S-TTI (<1 msec), normal TTI (=1 msec), and L-TTI (>1 msec) exist as TTI.

Meanwhile, eNB may allow a plurality of TTIs to be subjected to multiplexing at the same time in the same manner as that a plurality of TTIs are multiplexed within one subframe. For example, PUSCH or PDSCH for 1 ms TTI may be scheduled in a specific frequency domain, and sPUSCH or sPDSCH for S-TTI may be scheduled in another frequency domain of the same timing. At this time, the sPUSCH or sPDSCH for the S-TTI scheduled in another frequency domain may be intended for the same UE as that of PUSCH or PDSCH for S-TTI scheduled in a specific frequency domain, or may be intended for another UE different from that of PUSCH or PDSCH for S-TTI scheduled in a specific frequency domain. Also, a frequency domain of a channel for S-TTI may be restricted or configured separately to avoid entire or partial collision of mutual channel transmission. For example, in the next generation system, it may be consider to configure a frequency domain where sPDCCH and/or sPDSCH may be scheduled through higher layer signaling.

However, in the aforementioned method, scheduling for PDSCH may be configured dynamically, whereas sPDCCH and/or sPDSCH region may be configured semi-statically, whereby scheduling restriction may occur between sPDCCH and sPDSCH.

On the other hand, as another method, in the next generation system, it may consider to configure a frequency domain where sPDCCH and/or sPDSCH may operate, through PDCCH or another sPDCCH, or configure the frequency domain through a separate control channel or signaling. At this time, information, such as search space configuration, aggregation level and MCS (Modulation and Coding Scheme), required for decoding of sPDCCH and/or sPDSCH region or decoding of sPDCCH and/or sPDSCH may be configured through PDCCH.

For example, information on sPDCCH may be indicated by PDCCH, and a region for sPDCCH such as search space may basically be configured by an intersection between S-TTI frequency region indicated by PDCCH and a frequency resource region configured by a higher layer with respect to sPDCCH. At this time, sPDCCH transmission for the region configured as the intersection may be prior to sPDCCH transmission for another UE.

A resource indication field for fast DCI may be configured based on a system bandwidth. At this time, the UE needs to receive PDCCH indicating a corresponding region to successfully receive sPDCCH and/or sPDSCH. In the PDCCH detection procedure, the time for blind decoding attempt of PDCCH and the time for interpreting details of PDCCH by a higher layer end after detection of PDCCH or (s)DCI may be required. In this case, if the PDCCH, the sPDCCH and/or the sPDSCH are transmitted from the same subframe, a situation that decoding may not start even at the time when transmission of sPDCCH and/or sPDSCH is completed for PDCCH detection may occur in a specific S-TTI within the same subframe. Particularly, this situation may frequently occur in a single S-TTI or a plurality of S-TTIs located at a start part within a subframe. This situation may cause a problem that processing time in S-TTI becomes long excessively, and is not suitable for a purpose of use of S-TTI to reduce latency.

To solve this problem, the present invention proposes methods for efficiently performing resource management considering processing time in a plurality of procedures for scheduling sPDCCH and/or sPDSCH. The methods proposed in the present invention are not independent from each other, and a plurality of methods may be used in combination. Also, frequency resource configuration is only exemplary, and like a position and density of DM-RS, may indicate a method for transmitting sPDCCH and/or sPDSCH through another (s)PDCCH. Also, frequency resource configuration may include information on another channel in addition to sPDCCH and/or sPDSCH.

Embodiment 1

Reduction of Blind Decoding Attempt for Channel Indicating Resource Information on sPDCCH and/or sPDSCH In this embodiment, (s)DCI transmitted through PDCCH may indicate information on a frequency domain with respect to sPDCCH and/or sPDSCH within the same subframe. At this time, as a part of a method for preventing latency of sPDCCH detection of a specific S-TTI from increasing through PDCCH detection/interpretation, blind decoding attempt for PDCCH or sPDCCH may be reduced. In detail, blind decoding information on PDCCH may be restricted to/configured for a UE for which a shortened TTI is configured, through higher layer signaling.

Otherwise, an index for CCE including the blind decoding information or search space candidate may previously be configured, or a resource including the blind decoding information may be restricted to/configured as a resource configured through a system information block (SIB) or a master information block (MIB).

Otherwise, the blind decoding information may be limited to a CCE or search space candidate specific to a common search space, and the resource including the blind decoding information may be configured in specifications and transmitted. For example, the blind decoding information may be included in a resource defined in accordance with a specific rule within a bandwidth configured for the UE. In this case, blind decoding may be performed by any one of a plurality of search space candidates.

The blind decoding information may be configured per search space and/or DCI format, and may be configured to be separately applied to each subframe. Also, the blinding decoding information may vary in a unit of a plurality of subframes or higher layer signaling period.

That is, a subframe or subframe period for which monitoring for PDCCH for transmitting blind decoding information is not required may be configured. For another example, with respect to a UE for which a shortened TTI is configured, PDCCH monitoring for blind decoding information may be configured to be performed for only a common search space. This is because that non-unicast PDSCH scheduled through PDCCH is required to be received even by the UE operating at a shortened TTI. Meanwhile, PDCCH indicating resource information on sPDCCH and/or sPDSCH may use DCI format 1C and/or DCI format 1A.

If the aforementioned technology is applied to the LTE and the common search space is shared with the existing UE, a portion of the common search space may be used for transmission of the blind decoding information. However, the common search space may be transmitted in accordance with common search space mapping of the LTE.

If the aforementioned technology is applied to NewRAT, the common search space may be mapped to distribute a resource for blind decoding information transmission. To this end, the search space may be configured separately or the resource may be configured separately. In this case, when another data information and control information are subjected to mapping, it may be assumed that the corresponding resources are subjected to rate matching. Therefore, if a transmission period of data information and control information is not maintained uniformly, a transmission period of reserved resources which are rate matched may be maintained uniformly, and rate matching pattern information as to whether the reserved resources have been transmitted may dynamically be notified through DCI.

Generally, processing time may become long due to the required interpreting time of corresponding DCI in a higher layer after a specific PDCCH is detected from the physical layer. Therefore, PDCCH indicating resource information on sPDCCH and/or sPDSCH may be interpreted in and applied to a physical layer end without being interpreted in a higher layer. On the other hand, resource information on sPDCCH and/or sPDSCH may be indicated based on a method for transmitting PDCCH. Also, some candidate groups to which sPDCCH and/or sPDSCH may be transmitted may be configured through a higher layer.

If a channel for blind decoding information shares a legacy common search space and an aggregation level is 8, a problem for a specific status may occur. That is, a problem may occur in that a bandwidth is small or a PDCCH region becomes small.

Therefore, this UE may receive indication as to whether blind decoding information is transmitted through a network. Also, if cross carrier scheduling or carrier aggregation is applied and indication for blind decoding information transmission is received even though common search space monitoring is not performed, the UE should perform common search space monitoring for a channel to which blind decoding information is transmitted. Whether the operation described in the embodiment 1 is performed may be configured through a higher layer.

Embodiment 2

Configuration of Application Timing of a Channel Indicating Resource Information on sPDCCH and/or sPDSCH With respect to a specific S-TTI within a subframe, to prevent latency speed from inefficiently occurring in accordance with PDCCH detection/interpretation, a channel indicating resource information on sPDCCH and/or sPDSCH, like PDCCH, may be transmitted at a timing prior to a subframe at corresponding sPDCCH and/or sPDSCH is transmitted. For example, resource information on sPDCCH and/or sPDSCH indicated by PDCCH may be applied at a specific time after the subframe at which PDCCH is transmitted. That is, the resource information may previously be configured to be applied from next subframe of the subframe at which PDCCH is transmitted. In this case, there is little difference between resource information transmission timing and application timing, whereby dynamic scheduling may be reflected relatively well.

For another example, the application timing of the resource information on sPDCCH and/or sPDSCH may be configured through DCI for transmitting the PDCCH or higher layer signaling. In this case, as there is no dependency between PDCCH and sPDCCH and/or sPDSCH within the same subframe, sPDCCH and/or sPDSCH detection attempt may start before the time when PDCCH detection/interpretation is completed in accordance with UE implementation, whereby gain may be obtained in view of latency.

In another aspect, a channel indicating resource information on sPDCCH and/or sPDSCH may be sPDCCH, which is transmitted at another timing point, not PDCCH. For example, sPDCCH indicating resource information may be transmitted within a second slot or transmitted at the last S-TTI. Therefore, a difference between a setup time of resource information on sPDCCH and/or sPDSCH and an application time thereof may be narrowed. However, this case may be vulnerable to error propagation. Whether to perform the operation described in the embodiment 2 may be configured through a higher layer.

Embodiment 3

Configuration of Application Period of a Channel Indicating Resource Information on sPDCCH and/or sPDSCH (s)PDCCH indicating resource information on sPDCCH and/or sPDSCH may be transmitted at only a specific subframe. For example, the channel indicating resource information may be transmitted just once, for example, may be transmitted only at a first subframe or the last subframe within one frame. Also, the channel indicating resource information may be transmitted in accordance with a period and/or timing offset configured through higher layer signaling. The UE may perform monitoring for the PDCCH on the basis of a transmission timing of PDCCH indicating the resource information. Also, after detecting/interpreting PDCCH indicating resource information on sPDCCH and/or sPDSCH, the UE may apply the resource information included in the PDCCH to a plurality of subframes not a single subframe.

That is, an application range of the resource information may correspond to all subframes within the frame to which the PDCCH indicating resource information is transmitted or next frame. If the period and/or timing offset is configured, the resource information on sPDCCH and/or sPDSCH may be applied for a corresponding period including a PDCCH reception timing, or the resource information on sPDCCH and/or sPDSCH may be applied for a corresponding period after the time when the PDCCH is received.

In this case, a rate of a TTI which can be managed inefficiently in view of latency may be lowered considerably in case of a sufficient long period which even includes the PDCCH reception timing. Whether to perform the operation described in the embodiment 3 may be configured through a higher layer.

Embodiment 4 sDCI Design During Multi-TTI Scheduling

As a method for reducing control overhead, sPDSCH or sPUSCH for a plurality of S-TTIs may be scheduled from single DCI. At this time, if a two-level sDCI scheme is applied, sPDSCH or sPUSCH for a plurality of S-TTIs may be scheduled from fast sDCI. In this case, it is required to define how to configure HARQ process ID, RV (Redundancy Version), NDI (New Data Indicator), and sPUCCH resource. Also, it is required to differently configure HARQ process related parameters per S-TTI regarding retransmission. To this end, two methods will be proposed as follows.

(1) sCCE index based implicit mapping may be configured for sPUCCH resources. That is, the sPUCCH resources may not be changed for a specific period with respect to sPDSCH scheduled in the same manner as sDCI including multi-TTI scheduling. In this case, to avoid collision with sPUCCH, sPDCCH scheduling for another S-TTI may be restricted. Also, sPUCCH resource offset signaled through a higher layer may be configured independently for each of multi-TTI scheduling and single TTI scheduling. Otherwise, sPDCCH scheduling may be configured UE specifically per UE, whereby collision with sPUCCH may be avoided.

(2) sPUCCH resources may be indicated by sDCI for performing multi-TTI scheduling based on ARI (ACK/NACK Resource Indicator). In this case, one resource may be allocated to a candidate resource region where PUCCH resource is signaled through RRC, per antenna port, and the allocated resource may be used for a plurality of TTIs.

Alternatively, to improve whole throughput, each candidate resource region signaled through RRC may be configured by a set of resources for a plurality of TTIs for resource change between TTIs like that frequencies allocated between TTIs vary. At this time, if PUCCH transmission is performed by a plurality of antenna ports, a set of resources for a plurality of TTIs may be configured independently per antenna port.

In case of a method for configuring HARQ process number, HARQ process numbers may be increased as much as 1 by starting from HARQ process number indicated by sDCI for initially scheduling multiple TTIs. At this time, if the HARQ process number exceeds a specific threshold value, the HARQ process number returns to 0, whereby the HARQ process numbers may be circulated. Also, if retransmission is required for a specific HARQ process, the eNB may transmit sDCI indicating retransmission at the S-TTI when retransmission is required. Increase or reduction of numbers in the method for increasing HARQ process numbers may be configured through sDCI or higher layer signaling.

In some embodiment, as a method for alleviating a portion where flexibility of the aforementioned methods may be reduced, a two-level DCI scheme may be used instead of using multi-TTI scheduling. For example, fast DCI may include HARQ process number, RV and/or NDI. At this time, whether sPDSCH which is received corresponds to new data or retransmission may be identified in accordance with an NDI value. Also, the UE may attempt sPDSCH reception at only S-TTI when fast DCI is detected after slow DCI is detected. For another example, if fast DCI is not detected after slow DCI is detected, the UE may recognize the corresponding sPDSCH as new data, and recognize the corresponding sPDSCH as retransmission if fast DCI is detected.

If multi-TTI scheduling is configured/used for a downlink or an uplink, a method for sharing resources between (s)PDCCH and (s)PDSCH at each TTI may be considered. For example, an uplink grant may be transmitted at TTI for scheduling even in the case that multi-TTI scheduling is being used for the downlink. Therefore, to this end, if a region is divided into an sPDCCH mapping region and an sPDSCH mapping region through an indicator field which can be allocated to the first or last CCE index in downlink assignment DCI, or if the region is divided into the sPDCCH mapping region and the sPDSCH mapping region based on CCE index to which corresponding DCI is transmitted, a method for applying a plurality of TTIs during multi-TTI scheduling will be proposed.

(1) Identification of the sPDCCH mapping region and the sPDSCH mapping region may be repeated for a plurality of TTIs for scheduling based on (s)DCI indicating multi-TTI scheduling.

At this time, (s)DCI indicating multi-TTI scheduling may include an indicator field included in DCI as described above, or may indicate multi-TTI scheduling through CCE into which DCI is mapped, like the first or last CCE index.

(2) sPDSCH mapping in sPDCCH region may be performed at only TTI for which (s)DCI indicating multi-TTI scheduling is transmitted, and sPDSCH mapping in sPDCCH region may not be allowed at the other scheduled TTIs.

The aforementioned method is extensively applicable to even a case of downlink or uplink SPS (Semi-persistent Scheduling). In this case, (s)DCI indicating multi-TTI scheduling may be replaced with SPS activation DCI. If DCI for a single TTI is detected in a state that multi-TTI scheduling is performed, it may be assumed that the DCI is prior to multi-TTI. Alternatively, if multi-TTI scheduling is performed, the UE may not perform DCI detection for the downlink at a multi-TTI transmission period. However, the UE may continue to monitor the uplink grant.

Also, since cross-TTI scheduling is possible, DCI for the downlink may be detected but rate matching for downlink scheduling DCI may not be performed. That is, in case of cross-TTI scheduling, rate matching may not be performed due to uncertainty of DCI detection. In detail, rate matching during DCI detection may be performed to be restricted to a case that a control region and a data region share resources. Therefore, in the case that there is no uplink grant of the same subframe region or cross-TTI scheduling, a region to which DCI is transmitted may be configured separately, or whether to perform rate matching during DCI detection per control resource set may be configured.

Embodiment 5

Method for Transmitting Channel Indicating Resource Information on sPDCCH and/or sPDSCH As described above, (s)DCI including resource information on sPDCCH and/or sPDSCH may be referred to as slow DCI. Also, the slow DCI may be transmitted through PDCCH or EPDCCH. Likewise, downlink control intended for operation based on 1 ms TTI, including PDSCH/PUSCH, will be referred to as DCI, and downlink control intended for operation of slow DCI and sPDCCH/sPUSCH scheduling will be referred to as sDCI. Also, sDCI for scheduling sPDSCH/sPUSCH will be referred to as fast DCI.

In the next generation system, PDSCH or sPDSCH scheduling or PUSCH or sPUSCH scheduling may be performed for a specific UE in a unit of a single subframe or a plurality of subframes. At this time, it is required to identify PDCCH candidate for scheduling PDSCH/PUSCH and PDCCH candidate for transmitting sDCI corresponding to sPDSCH and/or sPUSCH so as not to increase blind decoding times for PDCCH detection at a side of the UE. Also, the DCI may schedule sPDSCH and/or sPUSCH as well as information on sPDCCH and/or sPDSCH described in the present invention.

Now, a detailed example of PDCCH candidates to which sDCI including resource information on sPDCCH and/or sPDSCH, that is, slow DCI can be transmitted or PDCCH candidates to be monitored by the UE will be described.

(1) sDCI including resource information on sPDCCH and/or sPDSCH, that is, slow DCI may be transmitted through PDCCH candidates corresponding to a common search space. Alternatively, related information such as group RNTI may previously be configured for the UE through higher layer signaling. Meanwhile, if slow DCI is transmitted, scrambling and/or CRC masking may be used, and sDCI corresponding to slow DCI may be configured based on DCI format 1A/1C. However, when considering information included in slow DCI, it may be preferable that sDCI is designed based on DCI format 1A. In the aforementioned description, design based on DCI format 1A/1C is not limited to the case that combination of information to be included in DCI is maintained, and a final size of DCI may be maintained equally considering zero padding.

(2) The slow DCI may be transmitted through PDCCH candidates corresponding to a UE group-specific search space (UGSS). The UE group-specific search space may previously be configured for the UE through related information such as group RNTI through higher layer signaling. That is, the search space may be configured based on group RNTI. If slow DCI is transmitted, scrambling and/or CRC masking may be used.

The UE for which the UE group-specific search space is configured may use a UE group-specific search space as a search space for PDCCH for DCI transmission instead of a UE-specific search space (USS) based on UE RNTI, so as not to increase blind decoding times at a side of the UE. At this time, the UE group-specific search space may be configured per transmission mode or transmission mode group. For example, the UE group specific search space may be configured independently per transmission mode based on CRS and transmission mode based on DMRS, or the group specific search space may be configured independently per resource allocation type for sPDSCH. In this case, considering support of various transmission modes, PDCCH for slow DCI may be transmitted based on DCI format 1A. As described above, design based on DCI format 1A is not limited to the case that combination of information to be included in DCI is maintained, and a final size of DCI may be maintained equally considering zero padding. For example, if a size of slow DCI is greater than that of general DCI, the general DCI may equally be matched with the size of slow DCI by using the scheme of zero padding for the general DCI. In this case, DCI and sDCI may be identified by RNTI used during CRC masking.

If DCI, slow DCK and fast DCI are transmitted through the UE group-specific search space, the fast DCI may be designed based on DCI format dependent on the transmission mode such as DCI format 1/1B/1D/2/2A/2B/2C/2D. At this time, UE RNTI based CRC masking may be used for the DCI. CRC masking may UE-specifically be performed for the fast DCI based on RNTI different from UE RNTI for DCI. At this time, the different RNTI may be configured through a higher layer. Alternatively, instead of the different RNTI, UE RNTI may be used, and specific offset may additionally be configured for and applied to the fast DCI during CRC masking.

A detailed example of resource information on sPDCCH and/or sPDSCH which can be transmitted to sDCI corresponding to the slow DCI will be described. The slow DCI may be transmitted UE group-specifically, and at this time, DCI format which will be used to transmit the slow DCI may be DCI format for compact scheduling, such as 1A and 1C. However, a contiguous resource allocation scheme may be applied to the above format as a resource allocation type by a resource indication value (RIV), and actual physical resource block (PRB) mapping may be localized or distributive. On the other hand, a non-contiguous resource allocation scheme such as a bitmap scheme may be used for sPDSCH in accordance with a transmission mode.

An example of resource information on sPDCCH and/or sPDSCH which can be transmitted to sDCI corresponding to slow DCI will be described in more detail.

(1) Resource information on sPDCCH and/or sPDSCH is configured in accordance with a resource allocation type within a DCI format to which slow DCI is transmitted regardless of a transmission mode for sPDCCH. For example, a contiguous resource allocation scheme based on a resource indication value or a distributive scheme after allocation of a virtual resource may be used.

In accordance with the resource allocation information, resource allocation for sPDSCH may be performed. Alternatively, final resource allocation for sPDSCH may be performed based on an additional resource allocation value within a region configured in slow DCI through the fast DCI. For example, resource information on sPDCCH may be indicated by the slow DCI, and additional information for sPDSCH resource allocation, for example, information as to how many resource block groups allocate resources in the fast DCI may be indicated. Afterwards, a physical resource block set indicated by the slow DCI may be divided into a specific number of resource block groups and a specific physical block group or physical block group combination may be selected for sPDCSH transmission from the fast DCI.

(2) The resource information on sPDCCH and/or sPDSCH may be configured differently depending on a transmission mode for sPDCCH. That is, the transmission mode may be identified in accordance with a resource allocation type. For example, in case of a transmission mode in which a resource allocation type 0 or 1 is used, the resource allocation type 0 or 1 may be used even for the resource information on sPDCCH and/or sPDSCH in the slow DCI. Similarly, in case of a transmission mode in which a resource allocation type 2 is used, the resource allocation type 2 may be used even for the resource information on sPDCCH and/or sPDSCH in the slow DCI.

(3) The resource information on sPDCCH and/or sPDSCH may indicate a plurality of resource allocation types. In this case, an indicator field as to which resource allocation type is used may be added, and a main value for a size of the slow DCI may be set based on a resource allocation type which makes the size of the slow DCI to be the greatest, among the resource allocation types.

Now, an embodiment for reducing blind decoding times when an entire size of the slow DCI becomes greater than a size of general DCI due to a change of a resource allocation type will be described.

(1) The size of the general DCI may be equal to that of the slow DCI by using zero padding.

(2) The size of the slow DCI may be equal to or smaller than that of the general DCI to increase a resource block group size or not to use a partial resource block group or resource block group set.

If the size of the slow DCI becomes smaller than that of the general DCI by the aforementioned scheme, zero padding may be applied to the slow DCI such that the size of the slow DCI may be equal to that of the general DCI. If PDCCH for the slow DCI corresponds to a common search space, it may be preferable that the size of the slow DCI is matched with the size of the general DCI.

Also, if a size of payload supported is sufficiently great like the DCI format 1A, the resource information on sPDCCH and/or sPDSCH to be applied at a specific subframe or specific subframe period may include both resource information on a frequency domain and resource information on a time domain, and may indicate the time when S-TTI starts.

Transmission of DCI may be omitted, or if DCI is transmitted, the transmitted DCI may include information on a current subframe and/or information on next subframe. For example, in the same manner as uplink index, 2 bits may be used to designate a subframe to which information included in DCI corresponds.

At this time, the information included in DCI may include information on a region where S-TTI operation is used and information on a region where S-TTI operation is not used, and whether to use a single DCI scheme for scheduling sPDSCH and/or sPUSCH or use a two-level DCI scheme and a region where a single DCI scheme or two-level DCI scheme is used may be configured through one sDCI.

In addition to the resource information on sPDSCH and/or sPUSCH, additional information may be transmitted to the slow DCI. For example, CIF (carrier indicator filed), TPC (transmit power command), precoding information, SRS (Sounding Reference Signal) request, and PDSCH resource mapping and Quasi-Co-Location indicator (PQI) information may be included in the slow DCI.

In detail, CIF may be transmitted by being included in the slow DCI, and may not be transmitted from the fast DCI. In this case, if a specific UE is configured to monitor the slow DCI in a cell different from a cell which will transmit sPDSCH/sPUSCH, the UE may monitor the fast DCI from the cell for scheduling the fast DCI, that is, the different cell. Alternatively, cross carrier scheduling may be configured for only the slow DCI, and the fast DCI may be configured such that a cell for performing scheduling and a cell which is scheduled are always equal to each other, whereby overhead due to the fast DCI may be prevented from being concentrated on a specific cell.

The SRS request may be used if a specific transmission mode is configured. At this time, since the SRS can be transmitted from only the last symbol of an uplink subframe, it is preferable that the SRS is transmitted from only the slow DCI. If a single DCI type is operated, an SRS request field may be included in only sDCI of a specific S-TTI. At this time, it is preferable that the specific S-TTI is S-TTI located at the first or last part of one subframe.

The PQI may be included only if a specific transmission mode is configured. If CoMP technology is performed, it is likely that operation is performed in a unit of subframe instead of S-TTI. In this case, it is preferable that the PQI is included in the slow DCI. However, since the PQI is a parameter dependent on the transmission mode, the PQI may be transmitted from the fast DCI.

Embodiment 6

Method for Indicating Resource Information on sPDCCH and/or sPDSCH if Carrier Aggregation Technology is Applied In the next generation system, the slow DCI may indicate resource information on sPDCCH and/or sPDSCH. Also, the resource information may be transmitted UE-specifically. At this time, considering carrier aggregation, a method for indicating resource information on sPDCCH and/or sPDSCH for SCell is required. Therefore, in the present invention, an embodiment of a method for indicating resource information on sPDCCH and/or sPDSCH for SCell will be described as follows.

(1) A specific UE may monitor the slow DCI through only one cell per cell group or PUCCH cell group. In this case, the resource information on sPDCCH and/or sPDSCH may equally be applied to all cells within a cell group or PUCCH cell group on the basis of the information transmitted from the slow DCI. For example, although the slow DCI is transmitted from only a specific cell, a plurality of slow DCIs may be transmitted per UE group. That is, the slow DCI corresponding to each UE group may be transmitted from one cell.

The resource information on sPDCCH and/or sPDSCH may equally be applied to all cells within a cell group or PUCCH cell group per UE group and in accordance with information within the slow DCI corresponding to each UE group.

(2) The specific UE may receive the slow DCI per cell. That is, the UE may perform common search space monitoring for slow DCI detection even with respect to SCell in addition to PCell.

(3) The specific UE may monitor the slow DCI through only one cell per cell group or PUCCH cell group. For example, sPDCCH and/or sPDSCH resources for SCell may be configured through higher layer signaling.

(4) If a plurality of cells are configured, the sPDCCH and/or sPDSCH resources may be configured for all cells through higher layer signaling.

Embodiment 7

Fallback Operation of UE During Failure of Channel Detection Indicating Resource Information on sPDCCH and/or sPDSCH In this embodiment, if the UE fails in detection of the slow DCI, UE operation for a specific period such as a specific subframe or time domain to which the slow DCI is applied and UE operation corresponding to the case that the UE does not decode information on the slow DCI will be suggested.

In the next generation system, the fast DCI may be configured in a plurality of frequency domains through higher layer signaling. If the slow DCI exists, some of the plurality of frequency domains, an aggregation level, an aggregation level set, etc. may be indicated through the slow DCI, whereby processing time for fast DCI detection may be reduced.

However, if the slow DCI is not detected, the UE may perform monitoring for the fast DCI with respect to some or all of the plurality of frequency domains, the aggregation level and the aggregation level set configured by a higher layer. At this time, the plurality of frequency domains configured by the higher layer may be referred to as a default frequency domain. Likewise, the aggregation level and the aggregation level set configured by the higher layer may be referred to as a default aggregation level or a default aggregation level set.

Figure 8:
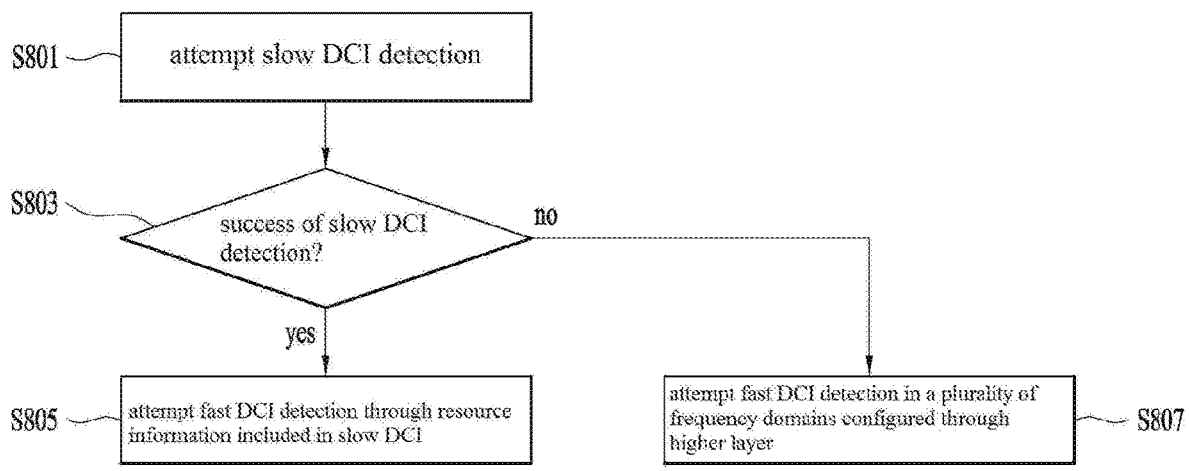
FIG. 8 illustrates a method for detecting two-level DCI according to the embodiment of the present invention.

The aforementioned description will be given briefly with reference to FIG. 8. First of all, the UE attempts detection of the slow DCI (S801). Afterwards, in accordance with success or failure of the detection of the slow DCI (S803), if the detection of the slow DCI is successfully performed, the UE attempts detection of the fast DCI through resource information included in the slow DCI (S805). If the UE fails in the detection of the slow DCI, the UE performs monitoring of the fast DCI for some or all of the plurality of frequency domains configured through the higher layer (S807).

Now, a detailed embodiment of a UE operation when the UE fails in the detection of the slow DCI will be described.

(1) The UE may maintain DCI reception timing, sPDSCH reception timing, sPUSCH transmission timing and/or HARQ-ACK feedback timing regardless of the detection of the slow DCI. If transmission and reception timing is indicated by general DCI, etc., a range of its indication value may be maintained equally regardless of the detection of the slow DCI. The processing time required for fast DCI detection according to failure or incompletion of the slow DCI detection may be longer than the processing time required for detection of the fast DCI by detecting the slow DCI and using the detected information. Therefore, to maintain the processing time for later transmission, a separate work may be required.

For example, if decoding time is not sufficient due to the failure of the slow DCI detection, corresponding decoding may be determined to be previously skipped, or decoding may be stopped in the middle of decoding. In this case, HARQ-ACK feedback may be configured as NACK. On the other hand, HARQ-ACK may not be transmitted as the case may be. If the UE transmits ACK/NACK signal per code block, the UE may transmit NACK signal to only a code block for which decoding is not performed. Alternatively, to indicate that there is a problem in reception of the slow DCI, the UE may transmit a separate state indication signal different from ACK/NACK signal.

The aforementioned method may equally be applied to even ACK/NACK bundling for a plurality of TTIs, subframes and slots. However, DTX instead of NACK may be transmitted during ACK/NACK bundling if decoding is failed. However, sPUSCH may not be transmitted if encoding time is not sufficient.

The operations of the aforementioned UE may be determined by capability of the UE. In detail, if it is determined that processing time according to UE capability is not sufficient, the operation of the UE may be performed based on the aforementioned operation. In other cases, sPDSCH decoding, HARQ-ACK determination, and sPUSCH encoding may be performed. At this time, capability of the UE may be signaled per channel or UE.

(2) Fast DCI reception timing of the UE, sPDSCH reception timing, sPUSCH transmission timing and/or HARQ-ACK feedback timing may vary depending on detection of the slow DCI. If the transmission and reception timing is indicated by general DCI, a range of its indication value may vary. At this time, blind decoding of the eNB may be required depending on the changed timing of sPDSCH, sPUSCH and HARQ-ACK feedback. Values of the changed sPDSCH reception timing, sPUSCH transmission timing and/or HARQ-ACK feedback timing may be configured through a higher layer, and may be configured by capability of the UE. If the values are configured by capability of the UE, the UE may report a value related to its capability or a value available as the transmission and reception timing to the eNB through UE capability signaling, and may finally configure the value through higher layer signaling. The values of the sPDSCH reception timing, the sPUSCH transmission timing and/or the HARQ-ACK feedback timing may be determined in accordance with scheduling information such as a transmission block size (TBS) in addition to the detection or failure of the slow DCI.

Also, considering resources of a network and various statuses, the UE may assume that one or more slow DCIs are transmitted at a given period. For example, it may be assumed that one slow DCI is transmitted within 5 ms or 10 ms and resource information included in the slow DCI is valid from TTI, subframe and slot, for which the slow DCI is transmitted, to next slow DCI interval. That is, it may be assumed that resource information included in the slow DCI is valid as much as twice of a transmission period of the slow DCI.

If the slow DCI is not transmitted at next period, the UE may perform fallback operation at next period. At this time, it is assumed that the slow DCI may repeatedly be transmitted at any subframe or slot within a corresponding period. Also, it may be assumed that the same slow DCI is transmitted within the corresponding period. Information included in the slow DCI may be changed per period. Also, since the slow DCI may be transmitted at the last slot or the last subframe of the corresponding period, it may be assumed that a previous value is within a valid range for the last slot or the last subframe. To this end, the UE may receive a configuration of a period from the higher layer, and a valid period may separately be configured for the UE.

Figure 9:
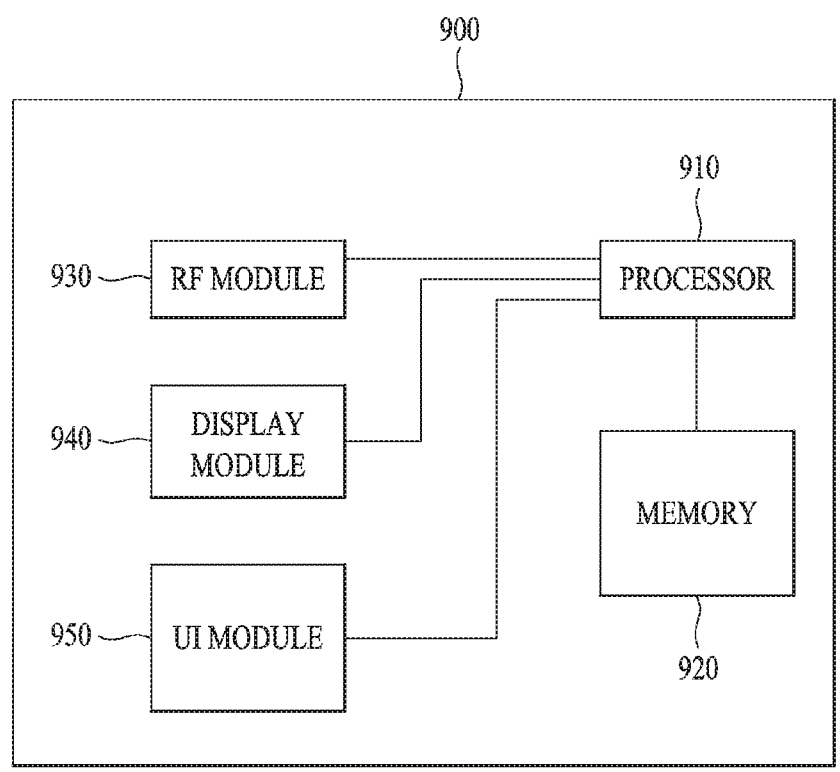
FIG. 9 illustrates a block schematic view of a communication apparatus according to one embodiment of the present invention.

FIG. 9 is a block diagram of a communication apparatus according to an embodiment of the present disclosure.

Referring to FIG. 9, a communication apparatus 900 includes a processor 910, a memory 920, an RF module 930, a display module 940, and a User Interface (UI) module 950.

The communication device 900 is shown as having the configuration illustrated in FIG. 9, for the convenience of description. Some modules may be added to or omitted from the communication apparatus 900. In addition, a module of the communication apparatus 900 may be divided into more modules. The processor 910 is configured to perform operations according to the embodiments of the present disclosure described before with reference to the drawings. Specifically, for detailed operations of the processor 910, the descriptions of FIGS. 1 to 8 may be referred to.

The memory 920 is connected to the processor 910 and stores an Operating System (OS), applications, program codes, data, etc. The RF module 930, which is connected to the processor 910, upconverts a baseband signal to an RF signal or downconverts an RF signal to a baseband signal. For this purpose, the RF module 930 performs digital-to-analog conversion, amplification, filtering, and frequency upconversion or performs these processes reversely. The display module 940 is connected to the processor 910 and displays various types of information. The display module 940 may be configured as, not limited to, a known component such as a Liquid Crystal Display (LCD), a Light Emitting Diode (LED) display, and an Organic Light Emitting Diode (OLED) display. The UI module 950 is connected to the processor 910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

In the aforementioned wireless communication system in which a shortened TTI is supported, although it has been described that the method for detecting downlink control information and the apparatus therefor are applied to the 3GPP LTE system, the method and the apparatus are applicable to various wireless communication systems in addition to the 3GPP LTE system.

What is claimed is:

1. A method performed by a user equipment (UE) in a wireless communication system, the method comprising:
   detecting first downlink control information transmitted from a specific cell;
   based on the first downlink control information being detected, detecting second downlink control information included in a shortened downlink control channel, based on resource information on the shortened downlink control channel included in the first downlink control information; and
   based on the first downlink control information being not detected, changing at least one of a shortened downlink data channel, a shortened uplink data channel, and a transmission and reception timing of ACK/NACK signals, which are previously configured based on capability of the UE,
   wherein changing the at least one of the shortened downlink data channel, the shortened uplink data channel, and the transmission and reception timing of the ACK/NACK signals comprises:
   measuring the capability of the UE and reporting the capability to the specific cell;
   receiving information for at least one of the shortened downlink data channel, the shortened uplink data channel, and the transmission and reception timing of the ACK/NACK signals, which are determined by the specific cell, based on the capability of the UE; and
   changing at least one of the shortened downlink data channel, the shortened uplink data channel, and the transmission and reception timing of the ACK/NACK signals, based on the received information.

2. The method of claim 1, wherein the second downlink control information comprises information on at least one of the shortened downlink data channel, the shortened uplink data channel and the transmission and reception timing of the ACK/NACK signals for a specific period.

3. The method of claim 1, wherein the first downlink control information is repeatedly received by comprising the same information within a specific period.

4. The method of claim 1, wherein at least one transmission and reception timing is changed further based on a size of a transmission block.

5. The method of claim 1, wherein, based on the first downlink control information being detected, the resource information for the shortened downlink control channel included in the first downlink control information is equally applied to at least one cell which belongs to the same group as that of the specific cell.

6. A user equipment (UE) operating in a wireless communication system, the UE comprising:
a memory; and
at least one processor coupled with the memory,
wherein the at least one processor is configured to:
detect first downlink control information transmitted from a specific cell;
based on the first downlink control information being detected, detect second downlink control information included in a shortened downlink control channel, based on resource information on the shortened downlink control channel included in the first downlink control information; and
based on the first downlink control information being not detected, change at least one of a shortened downlink data channel, a shortened uplink data channel, and a transmission and reception timing of acknowledgment/negative acknowledgment (ACK/NACK) signals which are previously configured based on capability of the UE,
wherein the at least one processor further configured to:
measure the capability of the UE and reporting the capability to the specific cell;
receive information for at least one of the shortened downlink data channel, the shortened uplink data channel, and the transmission and reception timing of the ACK/NACK signals, which are determined by the specific cell, based on the capability of the UE; and
change at least one of the shortened downlink data channel, the shortened uplink data channel, and the transmission and reception timing of the ACK/NACK signals, based on the received information.

7. The UE of claim 6, wherein the second downlink control information comprises information on at least one of the shortened downlink data channel, the shortened uplink data channel and the transmission and reception timing of the ACK/NACK signals for a specific period.

8. The UE of claim 6, wherein the first downlink control information is repeatedly received by comprising the same information within a specific period.

9. The UE of claim 6, wherein at least one transmission and reception timing is changed further based on a size of a transmission block.

10. The UE of claim 6, wherein, based on the first downlink control information being detected, the resource information on the shortened downlink control channel included in the first downlink control information is equally applied to at least one cell which belongs to the same group as that of the specific cell.

* * * * *